(12) United States Patent
Zhang

(10) Patent No.: US 8,317,175 B2
(45) Date of Patent: Nov. 27, 2012

(54) MANIPULATOR

(75) Inventor: Feng Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 332 days.

(21) Appl. No.: 12/750,896

(22) Filed: Mar. 31, 2010

(65) Prior Publication Data

US 2011/0121502 A1 May 26, 2011

(30) Foreign Application Priority Data

Nov. 23, 2009 (CN) .......................... 2009 1 0310218

(51) Int. Cl.
*B25B 5/08* (2006.01)

(52) U.S. Cl. ......................................... 269/234; 29/252

(58) Field of Classification Search .................. 269/234; 29/252, 255, 270, 271, 278, 280
See application file for complete search history.

(56) References Cited

U.S. PATENT DOCUMENTS

| | | | | | |
|---|---|---|---|---|---|
| 832,810 | A | * | 10/1906 | Richardson | 81/6 |
| 4,483,056 | A | * | 11/1984 | Schwalm et al. | 29/237 |
| 5,890,271 | A | * | 4/1999 | Bromley et al. | 29/263 |
| 6,450,931 | B1 | * | 9/2002 | Frey | 483/28 |
| 6,450,932 | B1 | * | 9/2002 | Hirose et al. | 483/40 |
| 6,777,903 | B1 | * | 8/2004 | Ostwald | 318/568.21 |
| 2004/0010899 | A1 | * | 1/2004 | Winterhalter et al. | 29/252 |

* cited by examiner

*Primary Examiner* — Brian Glessner
*Assistant Examiner* — Adam Barlow
(74) *Attorney, Agent, or Firm* — Altis Law Group, Inc.

(57) ABSTRACT

A manipulator includes a driving member, a sliding rod and a sleeve. The sliding rod includes an expanding portion on an end thereof. The sleeve includes at least two expanding sections on an end thereof. The driving member drives the sleeve to slide along the sliding rod. The two or more expanding sections are elastically bent outward via pressing against the expanding portion, and are resumed to their original shape and positions via detaching from the expanding portion.

9 Claims, 3 Drawing Sheets

MANIPULATOR

BACKGROUND

1. Technical Field

The present disclosure relates to manipulators, and particularly, to a manipulator used to grip a workpiece having a circular hole.

2. Description of the Related Art

A robot is a high-tech automated piece of equipment, and has developed rapidly in recent decades. A manipulator is an important feature of a robot.

A typical manipulator includes a plurality of mechanical fingers. When the manipulator is applied to grip a workpiece having a circular hole, the mechanical fingers clamp on an outer surface of the workpiece, using similar mechanics to that of a hand. However, the conventional manipulator can only grip a rectangular or circular-shaped workpiece, but cannot grip a workpiece which has a smaller outer surface and comprising a substantially round hole, for example, a hollowed rod-shaped workpiece, a ring-shaped workpiece, etc.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
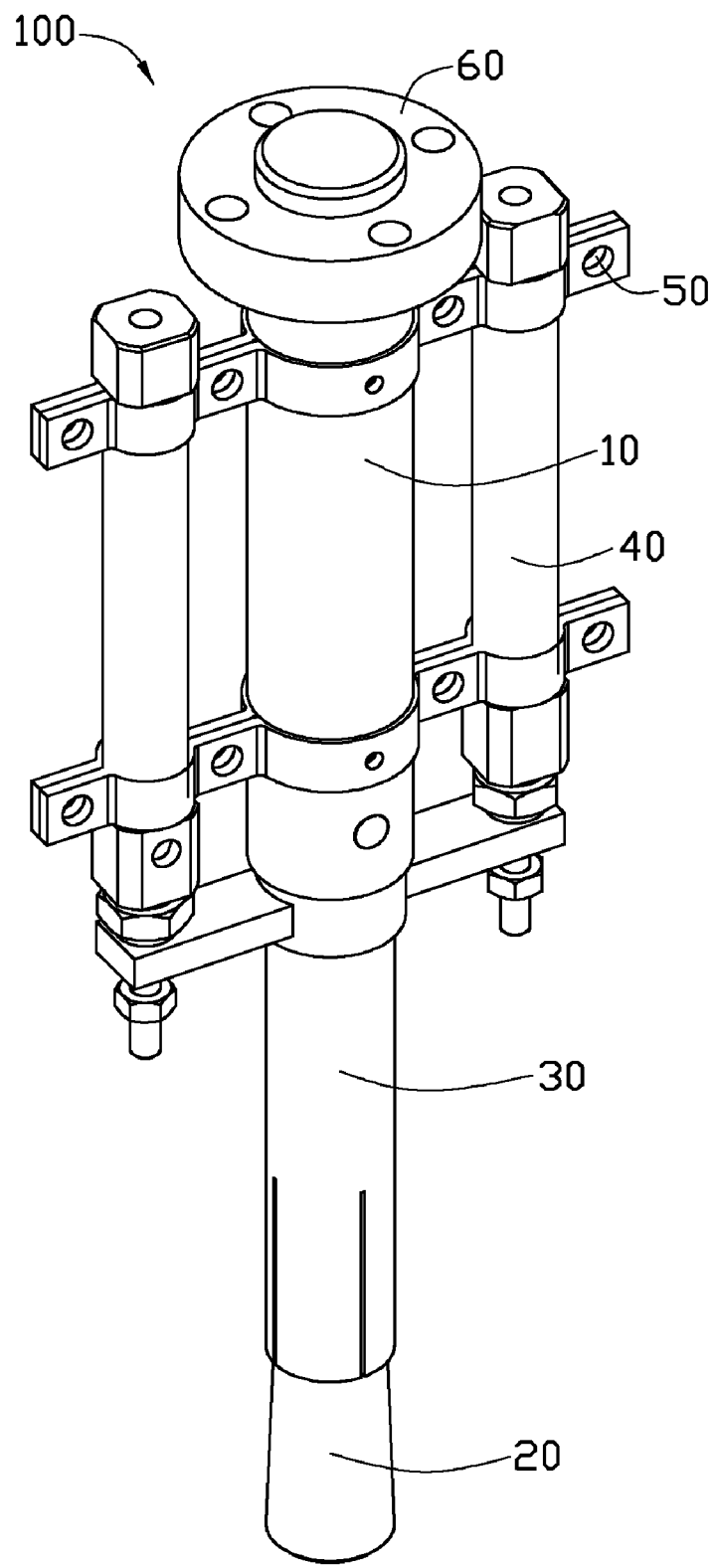
FIG. 1 is an assembled, partial, isometric view of a manipulator as disclosed.

Referring to FIG. 1, one embodiment of a manipulator 100 as disclosed includes a connecting shaft 10, a sliding rod 20, a sleeve 30, two driving members 40, a plurality of fixing clamps 50 and a connecting bearing 60. The sliding rod 20 is fixedly connected coaxially to the connecting shaft 10. The sleeve 30 is slidably sleeved on the sliding rod 20. The driving members 40 drive the sleeve 30 to slide along the sliding rod 20. The fixing clamps 50 fix the driving members 40 to the connecting shaft 10. The connecting bearing 60 is fixed at an end of the connecting shaft 10 away from the sliding rod 20.

Figure 2:
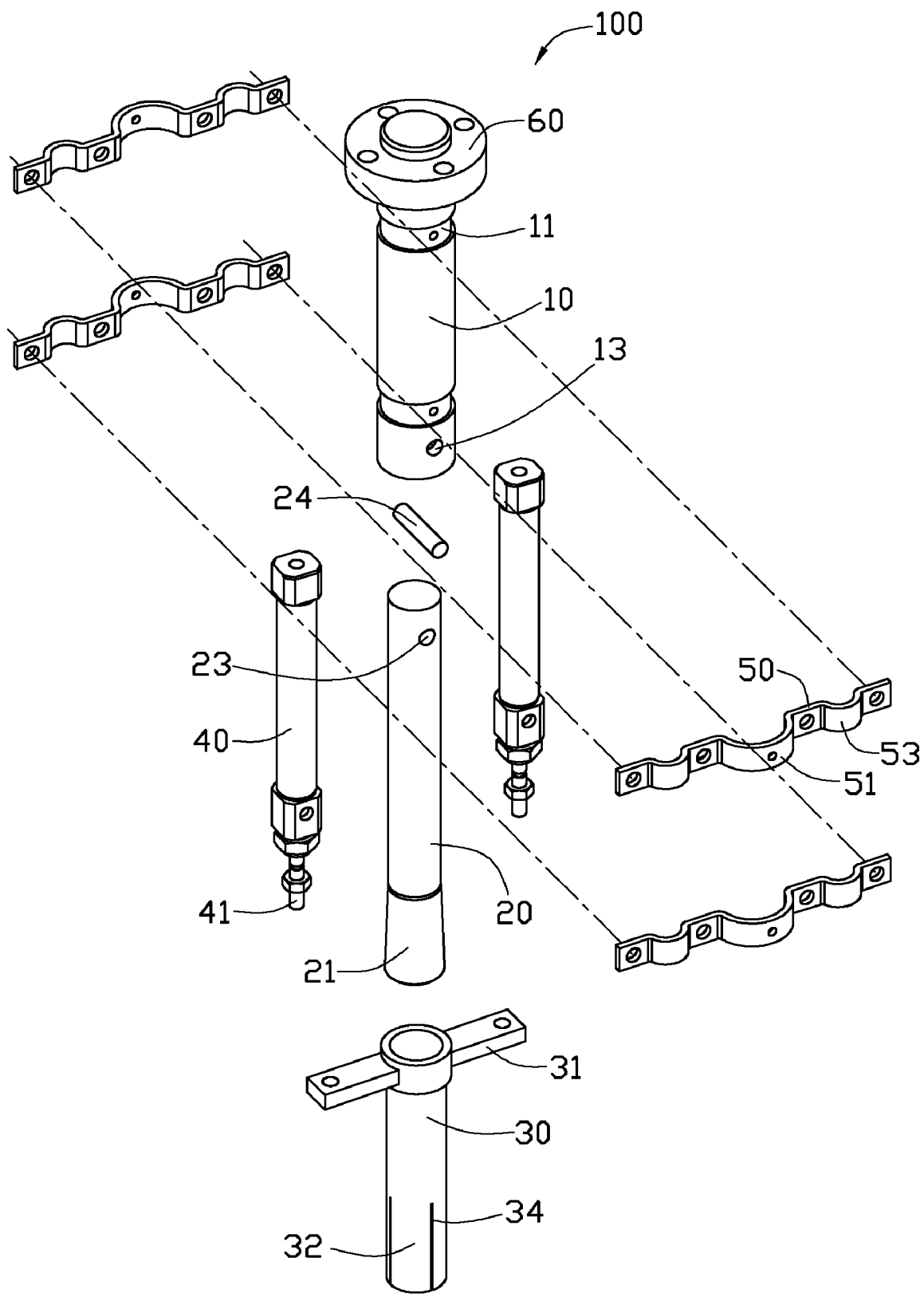
FIG. 2 is an exploded view of a manipulator shown in FIG. 1.

Referring to FIG. 2, the connecting shaft 10 defines two fixing grooves 11 on opposite ends. Each fixing groove 11 is substantially annular. The connecting shaft 10 further defines a pin hole 13 on an end of the connecting shaft 10 away from the connecting bearing 60, and defines a receiving hole (not shown) on the end surface of the connecting shaft 10.

The sliding rod 20 includes an expanding portion 21. The expanding portion 21 is arranged at an end of the sliding rod 20. In the illustrated embodiment, the expanding portion 21 is a substantially truncated cone-shaped structure, and extends along an axial direction of the sliding rod 20. A larger end of the expanding portion 21 is a free end. The sliding rod 20 defines a pin hole 23 on an end of the sliding rod 20 opposite to the expanding portion 21. The manipulator 100 further includes a pin 24. The pin 24 is inserted into the pin hole 23.

The sleeve 30 includes two connecting portions 31 and a plurality of expanding sections 32. The two connecting portions 31 are symmetrically arranged at an outer wall at an end of the sleeve 30. In the illustrated embodiment, the sleeve 30 is made of flexible steel. The sleeve 30 defines a plurality of notches 34 on the end thereof, such that the expanding sections 32 are formed between the notches 34.

Each driving member 40 is a telescopic cylinder or a motor, and includes a telescopic shaft 41.

Each fixing clamp 50 includes a first arched portion 51 and two second arched portions 53. The first arched portion 51 is formed in a middle portion of the fixing clamp 50. The two second arched portions 53 are formed at opposite ends of the fixing clamp 50.

Referring to FIGS. 1 and 2, during assembly of the manipulator 100, the sleeve 30 is firstly sleeved on the sliding rod 20. The expanding sections 32 of the sleeve 30 are slid toward the expanding portion 21 of the sliding rod 20. An end of the sliding rod 20 is received into the receiving hole of the connecting portion 10. The pin 24 is inserted into the pin hole 13 of the connecting shaft 10 and the pin hole 23 of the sliding rod 20, such that the sliding rod 20 is fixedly connected to the connecting shaft 10. The driving member 40 is fixed to the connecting shaft 10 via the fixing clamps 50, which are received into the fixing grooves 11 of the connecting shaft 10. The connecting shaft 10 is clamped between the first arched portions 51. The two driving members 40 are clamped between the second arched portions 53. The two driving members 40 are fixedly connected to the two connecting portion 31 of the sleeve 30. The connecting bearing 60 is fixed to an end of the connecting shaft 10 away from the sliding rod 20.

Figure 3:
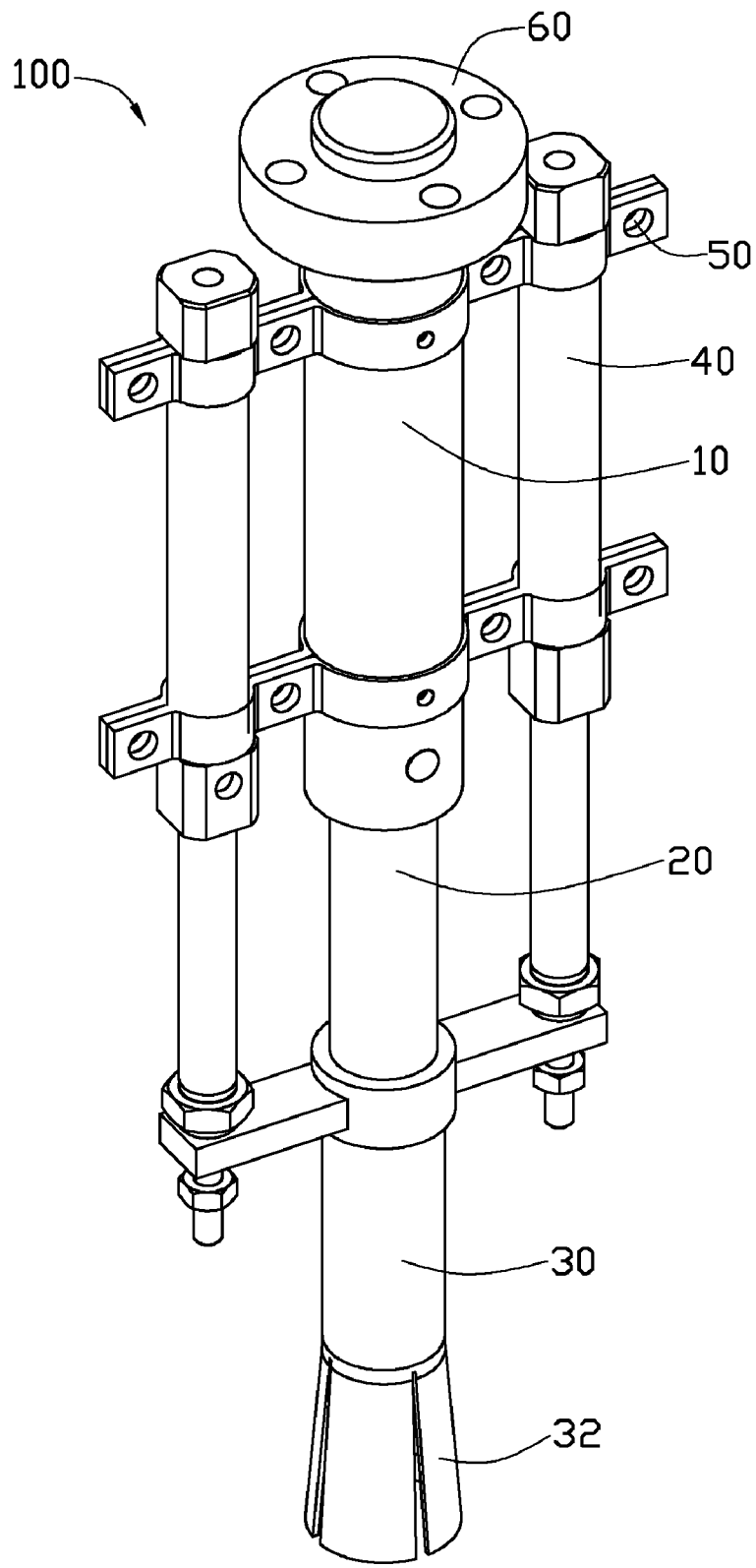
FIG. 3 is similar to FIG. 1, but showing a working state of the manipulator.

Referring to FIGS. 2 and 3, when the manipulator 100 grips a workpiece (not shown) having a substantially circular hole, the expanding sections 32 of the sleeve 30 are firstly received in the circular hole along with the sliding rod 20. The driving members 40 drive the sleeve 30 to slide toward the expanding portion 21 of the sliding rod 20. The expanding sections 32 of the sleeve 30 are elastically bent outward by pressing against the expanding portion 21 of the sliding portion 20, such that expanding sections 32 are clamped into and gripping against the circular hole.

When the manipulator 100 unloads the workpiece, the driving members 40 drive the sleeve 30 to slide toward the connecting shaft 10. The expanding sections 32 of the sleeve 30 are then detached and moved away from the expanding portion 21 of the sliding rod 20, such that the expanding sections 32 are resumed to their original shape and positions. Therefore, the expanding sections 32 are thereby detached from the circular hole of the workpiece.

The expanding sections 32 of the sleeve 30 are clamped into the circular hole of the workpiece, such that the manipulator 100 grips the workpiece without being limited by the shape of the workpiece.

It is to be understood that the materials of expanding sections 32 can be different from that of the main body of sleeve 30. The number of the expanding sections 32 can be two or more. The expanding portion 21 of the sliding rod 20 can be a truncated pyramid or other shapes. The number of the driving members 40 can be one or more.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A manipulator comprising:
a driving member;
a sliding rod comprising an expanding portion on an end thereof; and
a sleeve comprising at least two expanding sections on an end thereof, wherein the driving member drives the sleeve to slide along the sliding rod, the at least two expanding sections are elastically bent outward via pressing against the expanding portion, and the expanding sections are resumed to their original shape and positions via detaching from the expanding portion, wherein the expanding portion is a substantially truncated cone-shaped structure extending along an axial direction of the sliding rod, the sleeve further comprises two connecting portions symmetrically arranged at an outer wall of an end of the sleeve, and the two connecting portions are fixed to the driving member.

2. The manipulator of claim 1, further comprising a connecting shaft fixedly connected to the sliding rod.

3. The manipulator of claim 2, wherein the connecting shaft is coaxial to the sliding rod.

4. The manipulator of claim 2, further comprising a plurality of fixing clamps fixing the driving member to the connecting shaft.

5. The manipulator of claim 4, wherein the connecting shaft defines two fixing grooves on opposite ends thereof, and the fixing clamps are received in the fixing grooves.

6. The manipulator of claim 4, wherein each fixing clamp comprises a first arched portion in a middle portion thereof and two second arched portions on opposite ends thereof, the first arched portion clamping the connecting shaft, and the two second arched portions clamping the driving member.

7. The manipulator of claim 2, further comprising a connecting bearing fixed at an end of the connecting shaft away from the sliding rod.

8. A manipulator comprising:
a driving member;
a sliding rod comprising an expanding portion on an end thereof;
a sleeve comprising at least two expanding sections on an end thereof, wherein the driving member drives the sleeve to slide along the sliding rod, the at least two expanding sections are elastically bent outward via pressing against the expanding portion, and the expanding sections are resumed to their original shape and positions via detaching from the expanding portion;
a connecting shaft fixedly connected to the sliding rod; and
a plurality of fixing clamps fixing the driving member to the connecting shaft;
wherein the connecting shaft defines two fixing grooves on opposite ends thereof, and the fixing clamps are received in the fixing grooves.

9. A manipulator comprising:
a driving member;
a sliding rod comprising an expanding portion on an end thereof;
a sleeve comprising at least two expanding sections on an end thereof, wherein the driving member drives the sleeve to slide along the sliding rod, the at least two expanding sections are elastically bent outward via pressing against the expanding portion, and the expanding sections are resumed to their original shape and positions via detaching from the expanding portion;
a connecting shaft fixedly connected to the sliding rod; and
a plurality of fixing clamps fixing the driving member to the connecting shaft;
wherein each fixing clamp comprises a first arched portion in a middle portion thereof and two second arched portions on opposite ends thereof, the first arched portion clamping the connecting shaft, and the two second arched portions clamping the driving member.

* * * * *